United States Patent
Yamagata

(10) Patent No.: US 7,388,922 B2
(45) Date of Patent: *Jun. 17, 2008

(54) RECEIVER

(75) Inventor: Taku Yamagata, Kawasaki (JP)

(73) Assignee: Sony United Kingdom Limited, Weybridge (GB)

( * ) Notice: Subject to any disclaimer, the term of this patent is extended or adjusted under 35 U.S.C. 154(b) by 486 days.

This patent is subject to a terminal disclaimer.

(21) Appl. No.: 11/087,317

(22) Filed: Mar. 23, 2005

(65) Prior Publication Data

US 2005/0213679 A1    Sep. 29, 2005

(30) Foreign Application Priority Data

Mar. 26, 2004    (GB) ................... 0406876.3

(51) Int. Cl.
*H04K 1/10*    (2006.01)
(52) U.S. Cl. .............. 375/260; 375/232; 375/316
(58) Field of Classification Search ............. 375/229, 375/230, 232, 259, 260, 316, 340
See application file for complete search history.

(56) References Cited

U.S. PATENT DOCUMENTS

| 2003/0012308 A1 | 1/2003 | Sampath et al. |
| 2003/0063678 A1 | 4/2003 | Crawford |
| 2005/0105647 A1 | 5/2005 | Wilhelmsson et al. |

FOREIGN PATENT DOCUMENTS

| EP | 0 998 068 | 5/2000 |
| EP | 0 838 928 | 1/2001 |
| EP | 1 551 120 A1 | 7/2005 |
| WO | WO 03/098853 A1 | 11/2003 |

OTHER PUBLICATIONS

Vittoria Mignone, et al., "CD3-OFDM: A Novel Demodulation Scheme for Fixed and Mobile Receivers", IEEE Transactions on Communications, vol. 44, No. 9, XP -011008784, Sep. 1996, pp. 1144-1151.
Y. Harada, et al., "An Implementation of OFDM Receiver for Digital Terrestrial Television Broadcasting and its Technologies", International Broadcasting Convention, Conference Publication No. 447, XP-006508780, Sep. 1997, pp. 337-342.
Henrik Schober, et al., "Velocity Estimation for OFDM Based Communication Systems", IEEE Vehicular Technology Conference Proceedings (VTC 2002-Fall), vol. 1, No. 4, Conf. 56, XP-010608905, Sep. 24, 2002, pp. 715-718.
Lei Wan, et al., "Theoretical Analysis of the Pilot Tones Assisted COFDM System over Fast Multipath Fading Channels", IEEE Vehicular Technology Conference, (VTC 2000), vol. 3, XP-010524684, Sep. 2000, pp. 1170-1174.

*Primary Examiner*—Chieh M. Fan
*Assistant Examiner*—Naheed Ejaz
(74) *Attorney, Agent, or Firm*—Oblon, Spivak, McClelland, Maier & Neustadt, P.C.

(57) ABSTRACT

A receiver for recovering data from a received symbol of signal samples generated in accordance with Orthogonal Frequency Division Multiplexing (OFDM) includes a pilot assisted channel estimator operable to generate an estimate of a transmission channel through which the received OFDM symbol has passed. The OFDM symbol includes pilot signals provided at different sub-carrier locations for each of a set of OFDM symbols, the sub-carrier locations of the pilot signals being repeated for subsequent sets of symbols. The pilot assisted channel estimator includes a pilot extractor, a time interpolation filter controller and an adaptive bandwidth interpolation filter.

20 Claims, 8 Drawing Sheets

RECEIVER

FIELD OF INVENTION

The present invention relates to receivers operable to recover data from a received symbol of signal samples, the symbol having been generated in accordance with Orthogonal Frequency Division Multiplexing (OFDM). The present invention also relates to methods of detecting and recovering data from received signal samples.

BACKGROUND OF INVENTION

In multi-carrier modulation systems, such as OFDM systems, pilot symbols are often embedded at known sub-carrier locations within OFDM symbols in order to facilitate estimation of the channel through which the OFDM symbol has passed. An example of an OFDM system, which employs both scattered pilot signals and continuous pilot signals is that used for the DVB-T standard as disclosed in EN 300 744 Digital Video Broadcasting (DVB) Framing structure, channel coding and modulation for digital terrestrial television ([8]). Continuous pilot signals are pilot signals transmitted at the same relative sub-carrier location within the symbol, whereas scattered pilots are pilot signals transmitted at different sub-carrier locations for each of a set of OFDM symbols, the location of the pilots being repeated for a subsequent set of symbols.

As disclosed in "*Mobile reception of 2K and 8K DVB-T Signals*," by Erik Stare, Proceedings of IBC '98 pp 473-478 ([4]) pilot signals can be used in pilot-assisted channel estimation during demodulation of the OFDM symbol. As the pilots only occur at predetermined separated locations in both the frequency and time dimensions, interpolation is used to estimate the amplitude and phase response of the channel at sample points where no pilot carrier has been transmitted within a currently received OFDM symbol. Following both time and frequency interpolation, a sample of the channel frequency response can be generated (fully sampled version) for each sample in the received OFDM symbol. The estimated channel can therefore be cancelled from the received symbol, so that data conveyed by the symbol can be recovered. However, the interpolation can introduce noise into the channel estimate thereby degrading the performance of the receiver.

SUMMARY OF INVENTION

It is an object of the present invention to provide a receiver, which is arranged to estimate the channel through which the OFDM symbol has passed, with improved accuracy.

According to the present invention there is provided a receiver for recovering data from a received symbol of signal samples generated in accordance with Orthogonal Frequency Division Multiplexing (OFDM). The symbol includes pilot signals provided at different sub-carrier locations for each of a set of OFDM symbols, the sub-carrier location of the pilot signals being repeated for subsequent sets of symbols. The receiver includes a pilot assisted channel estimator operable to generate an estimate of a transmission channel through which the received OFDM symbol has passed. The pilot assisted channel estimator includes a pilot extractor, a time interpolation filter controller and an adaptive bandwidth time interpolation filter. The pilot extractor is operable to extract the pilot carrier signals from the signal samples, and to generate an estimate of a sample of the channel frequency response for each pilot signal in the received OFDM symbol, by comparing the extracted pilot carrier signals with predetermined versions of the pilot carriers. The adaptive bandwidth time interpolation filter is operable to interpolate the samples of the channel frequency response estimate derived from pilot carrier signals at corresponding sub-carrier locations within temporally separated OFDM symbols to generate an interpolated version of the channel frequency response estimate. The time interpolation filter controller is operable to generate an estimate of a rate of change of the channel frequency response with time and to adapt a pass bandwidth of the time interpolation filter in accordance with the determined rate of change of the channel.

Receivers according to embodiments of the present invention provide an improved technique for generating an estimate of a channel through which a received OFDM symbol has passed. As a result, the effects of the channel can be more effectively cancelled from the received OFDM symbol, thereby improving the likelihood of correctly recovering the data conveyed by the symbol. The receiver includes a pilot assisted channel estimator which includes a pilot extractor, a time interpolation filter controller and an adaptive bandwidth interpolation filter. The pilot extractor generates an estimate of the frequency response of the channel at each location where a pilot sub-carrier signal is transmitted in the OFDM symbol. Since the pilot signals are transmitted at different (scattered) locations, then a relative position of the pilot signals in the OFDM symbol will be different between successive OFDM symbols, although the position of the pilot signals will repeat after a predetermined cycle. For this reason a time interpolation filter is provided in order to interpolate the pilot generated samples of the channel frequency response, as determined between temporally separated OFDM symbols. The time interpolation filter therefore generates an up-sampled version of the channel frequency response by providing interpolated samples of the channel frequency response, where, for the currently received symbol, no pilot signal is provided. However, the interpolation filter may introduce noise into the up-sampled version of the channel frequency response estimate, in particular if the pass-bandwidth of the interpolation filter is greater than an effective bandwidth of the samples of the channel in the frequency domain, as determined by the rate of change of the channel frequency response.

Embodiments of the present invention provide receivers which include a pilot assisted channel estimator having an adaptive bandwidth interpolation filter and a time interpolation filter controller. The time interpolation filter controller is operable to generate an estimate of the rate of change of the channel frequency response and to adapt the bandwidth of the time interpolation filter in accordance with the estimated rate of change. The bandwidth of the interpolation filter is adapted with the effect that noise in the interpolated channel frequency response is reduced, by reducing the pass bandwidth to a minimum whilst still preserving as far as possible energy contained in the channel frequency response. As a result, noise in the up-sampled channel frequency response estimate can be reduced.

According to some embodiments, the adaptive bandwidth time interpolation filter comprises a plurality of interpolation filters each having a predetermined pass bandwidth. The time interpolation filter controller is operable to select one of the plurality of predetermined filters in accordance with the determined rate of change of the channel.

Various further aspects and features of the present invention are defined in the appended claims. These aspects include a pilot assisted channel estimator and a method of generating an estimate of a transmission channel through which a received Orthogonal Frequency Division Multiplexed (OFDM) symbol has passed.

BRIEF DESCRIPTION OF THE DRAWINGS

One embodiment of the present invention will now be described by way of example only with reference to the accompanying drawings wherein.

DESCRIPTION OF EXAMPLE EMBODIMENTS

List of Symbols & Abbreviations

The following list of symbols and abbreviations is provided to assist in the explanation of example embodiments of the invention.

$T_g$ Guard interval duration in seconds
$T_u$ Useful symbol duration in seconds
$N_u$ Number of samples in useful part of symbol
$\mu$ Channel impulse response delay spread
CIR Channel impulse response
CP Continuous pilot
CTF Channel transfer function
DVB-T Digital video broadcasting—terrestrial transmission
FFT Fast Fourier Transform
IFFT Inverse FFT
MF Matched filter
OFDM Orthogonal frequency division multiplexing
QAM Quadrature amplitude modulation
SP Scattered pilot
TOA Time of arrival
TPS Transmission parameters signalling Embodiments of the present invention provide an improved technique for estimating the frequency response of a channel through which an Orthogonal Frequency Division (OFDM) signal has passed. As explained in the following paragraphs, the channel frequency response or channel transfer function (CTF) is estimated using pilot symbols which are transmitted with each OFDM symbol (see below and FIG. 1). A pilot assisted channel estimator interpolates samples of the CTF derived from the pilot signals. As will be explained interpolation may be performed in one or both of the time and the frequency dimensions.

An example embodiment of the present invention will now be described with reference to detecting and recovering data from an OFDM symbol produced for example in accordance with Digital Video Broadcasting (DVB) standards including DVB-T and DVB-H. However, it will be appreciated that embodiments of the invention find application with other OFDM systems, such as, for example, the Japanese ISDB-T standard.

An OFDM symbol which is modulated in accordance with DVB standard is generated by modulating K narrow band carriers in parallel with the data to be communicated. As disclosed in the European telecommunications standards institute number EN300744 version 1.1.2 (1997-08) and entitled "Digital Video Broadcasting (DVB); Frame Structure Channel Coding And Modulation For Digital Terrestrial Television", the OFDM symbols are formed in the frequency domain and then converted to the time domain using an Inverse Fourier Transform.

In order to recover the data within the OFDM symbols, the receiver must detect the data bearing signal samples from within the set of received signal samples corresponding to each OFDM symbol.

Receiver With Channel Estimator and Corrector

Figure 1:
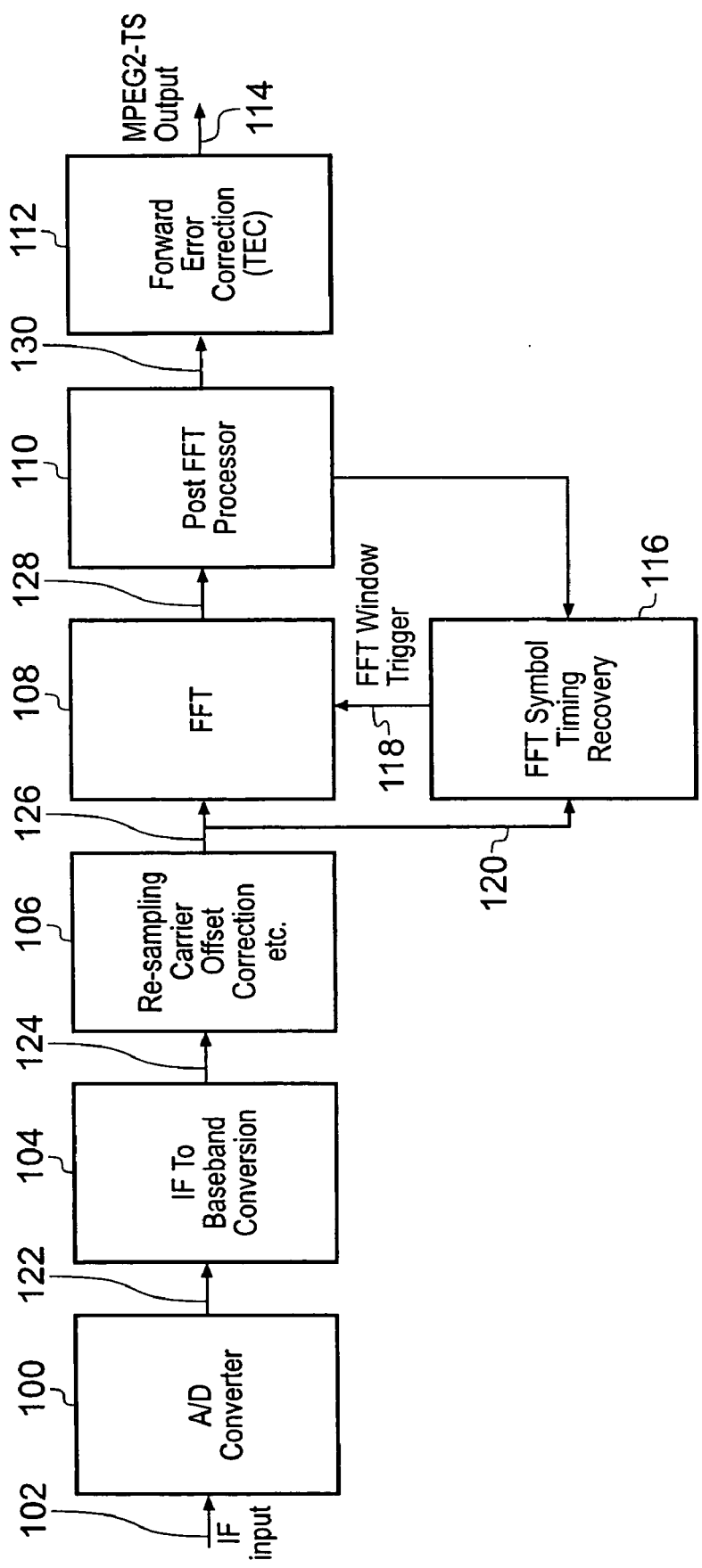
FIG. 1 is a schematic block diagram of a receiver according to an embodiment of the present invention.

A receiver for detecting and recovering data from an OFDM symbol is shown in FIG. 1. In FIG. 1 an analogue to digital converter 100 is arranged to receive an intermediate frequency (IF) signal representing the detected radio signal modulated by the OFDM symbol. The receiver also includes down conversion means and tuning means in order to tune to and convert the radio frequency signal into an intermediate frequency signal, which is fed to the analogue to digital converter 100 via an input 102. Thus it will be appreciated that the receiver may also include radio frequency receiving and down converting means which are not shown in FIG. 1. After being analogue to digitally converted the received signal is processed by an intermediate frequency to base band conversion means 104 before being processed by a re-sampling and carrier offset correction processor 106. In some embodiments, the radio frequency signal may be directly converted to baseband. In this case, the intermediate frequency input to the analogue to digital converter 100 is zero Hertz and so there is no need for the intermediate frequency to base band conversion means 104. The re-sampling and carrier offset correction processor 106 is arranged to track in the frequency domain the K carriers of the OFDM modulation. The base band received signal samples are then fed to a Fast Fourier transform processor 108 which serves to convert the time domain received signal samples into the frequency domain. The data is then recovered from the frequency domain signal samples by a post FFT processor 110. The data is then fed to a forward error correction processor 112 which operates to decode the error correction encoded data to produce the recovered data at an output 114.

The receiver according to this example locates an FFT window time from which the data bearing signal samples are processed by the FFT processor 108. The FFT window position is adjusted in order that the window includes the maximum energy representative of the data bearing signal samples. To this end, an FFT symbol timing recovery processor 116 is arranged to generate a signal indicative of a symbol sync time which is fed to the FFT processor 108 via a connecting channel 118. The FFT symbol timing recovery processor 116 is arranged to detect the Symbol Sync Time (SST) from the received set of signal samples which represent each OFDM symbol. These are received from the re-sampling and carrier offset correction processor 106 via a connecting channel 120.

Figure 2:
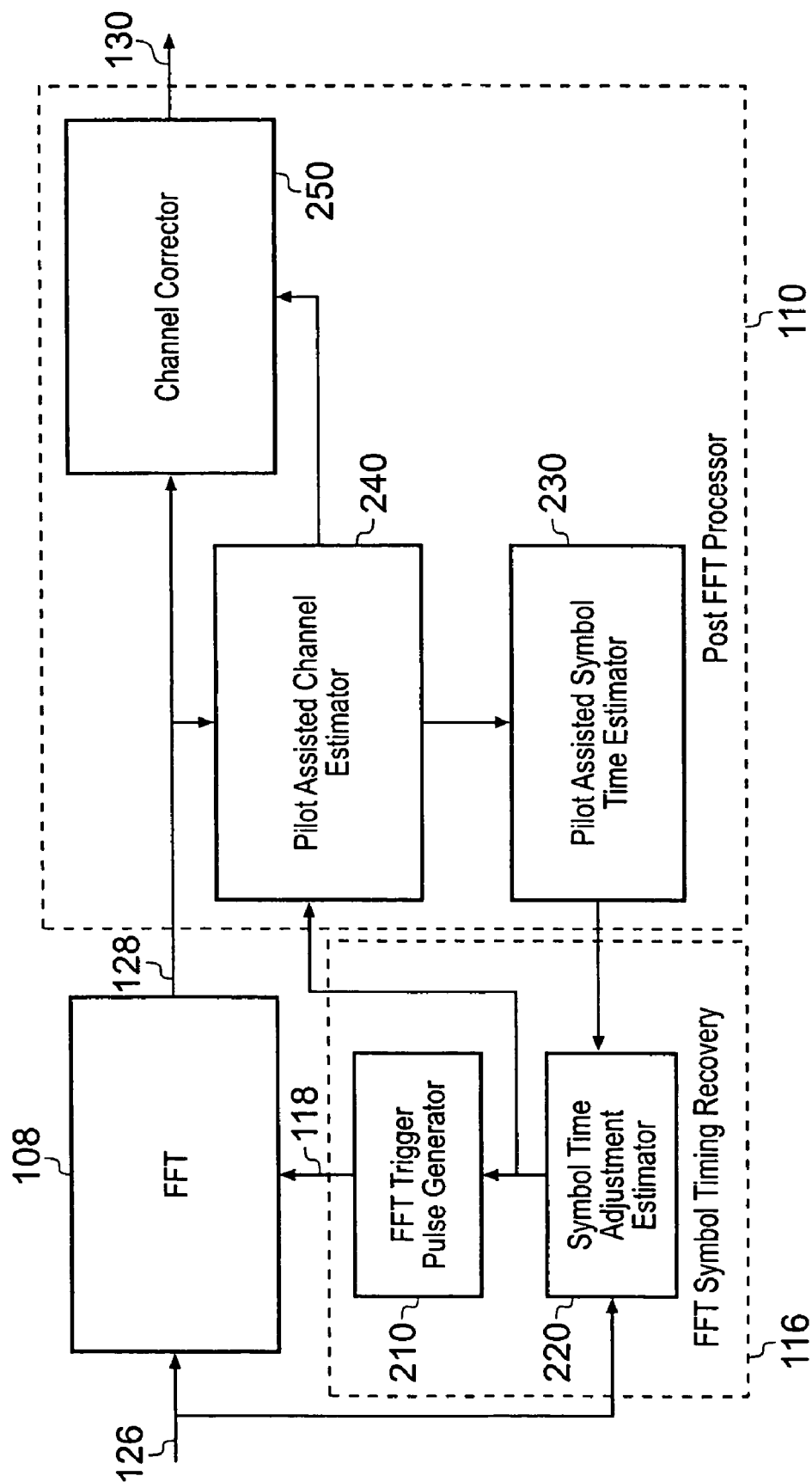
FIG. 2 is a schematic block diagram of an FFT block, FFT Symbol Timing Recovery block, and a Post FFT Processor block.

The FFT symbol-timing recovery processor 116 and the post-FFT processor 110 are shown in more detail in FIG. 2. The FFT symbol-timing recovery processor 116 and the post-FFT processor 110 operate to provide a symbol timing recovery process, which is described in [1].

In FIG. 2, the time domain samples representing the OFDM symbol are received by the FFT processor 108. The FFT processor 108 converts the time domain samples into the frequency domain. The frequency domain samples are then fed to the post-FFT processor 110. The time domain samples are also fed to a symbol timing recovery processor 116, and in particular to a symbol time adjustment estimator 220. As explained in [1], the symbol time adjustment estimator 220 includes a filter matched to the samples of the guard interval. The matched filter is excited by the OFDM symbol to produce an output signal from which the SST is calculated, assisted by a signal provided by the pilot assisted symbol time estimator 230. The output of the matched filter includes prominent pulses representing the discrete propagation paths existing on the channel. The SST is computed from the relative time of arrival of the earliest arriving prominent path. The difference between the relative times of arrival of the earliest and latest arriving paths is also calculated. This difference is an estimate of the channel response delay spread that is sent to the channel corrector 250.

More detail of the symbol synch time estimation and channel response delay spread will not be provided here since embodiments of the present invention concern the pilot assisted channel estimation. However, more detail is provided in [1].

Channel Correction for OFDM

Figure 3:
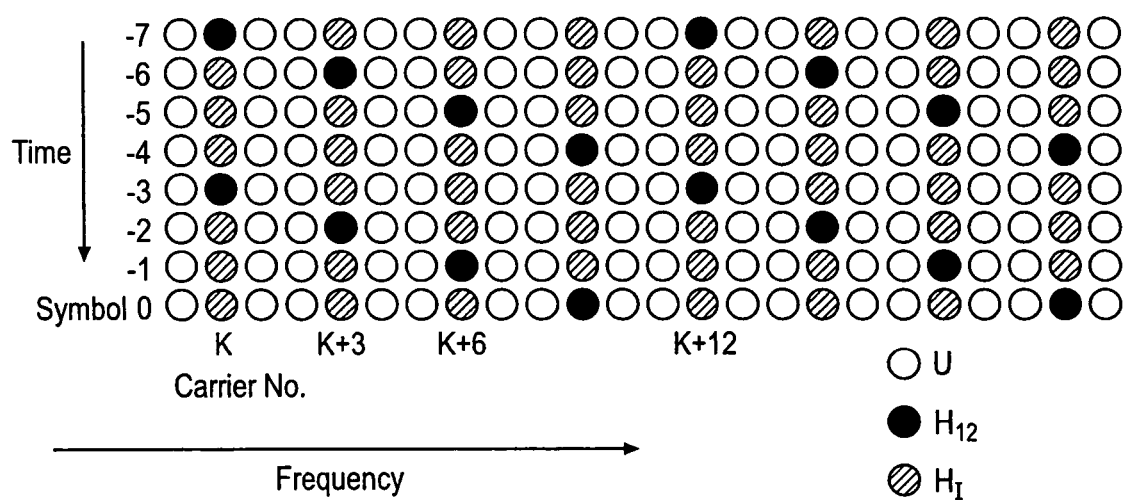
FIG. 3 is a schematic example time-frequency signal matrix for a DVB-T signal showing the distribution of pilot cells within the signal matrix.

FIG. 3 schematically illustrates a multi-carrier signal matrix representing the transmission of data using OFDM. The matrix is composed of symbols of duration $T_u$ seconds each symbol having bandwidth of $N_u/T_u$ where $N_u$ is the number of OFDM sub-carriers or cells in the signal. In the DVB-T system for example $N_u$ is 1705 for the so-called 2K system, 3409 for a 4K system and 6817 for the 8K system. The values for $T_u$ are respectively 224 us, 448 us and 896 us. In the DVB-T signal matrix illustrated in FIG. 3 the rows of the matrix represent the individual symbols in time whilst the columns show the sub-carriers (in the frequency domain) of the given symbol.

Each cell in the signal matrix of FIG. 3 is sent as a QAM symbol with varying amplitudes and phases dependent on the data at the transmitter. The expected amplitudes and phases of the pilot symbol cells are known both to the transmitter and the receiver. There are both continuous and scattered pilots present in the signal matrix. For continuous pilots, the amplitude and phase of a sub-carrier at the position of the continuous pilot is known for all symbols. On the other hand, the position of the scattered pilots within each symbol vary in accordance with a predetermined pattern. There may be other sub-carriers such as those that convey the transmission parameters signalling (TPS) whose phases and amplitudes can be readily derived at the receiver. Finally, the other cells (excluding TPS sub-carriers) are modulated with QAM symbols that carry the actual payload of the transmission system in their phases and amplitudes. It is the extraction of this payload that is the job of the demodulator.

Prior to transmission, each OFDM symbol or row of a matrix as illustrated in FIG. 3 is converted into the time domain using an inverse Fourier transform. As each time domain symbol transits through the transmission channel, it undergoes many distortions. Such distortions may include:

Additive noise, with effect being to perturb the amplitudes and phases of each of the cells in the signal matrix.

Frequency selective fading resulting from multipath propagation, with effect being to selectively attenuate some sub-carriers whilst boosting others in each symbol (row of the matrix). Furthermore, this frequency selective fading may be time varying in the sense that the same sub-carriers do not suffer the same degree of attenuation from one symbol to the next.

Doppler shifts which cause the sub-carriers to smear into each other thereby loosing their othogonality.

Other distorting effects that may arise from the receiver front end such as phase noise, carrier frequency offsets, impulsive interference and shifts in the FFT window position etc.

For a given cell in the signal matrix of FIG. 3, the effect of all these distortions can be modelled as a two-dimensional channel transfer function H(n,k) where n is the symbol (row) number and k is the sub-carrier (column) number. Given the complex value C(n,k) transmitted in a given cell, the complex value R(n,k) received in its place through such a channel is given by:

$$R(n,k)=C(n,k)H(n,k)$$

According to the present technique a pilot-assisted channel estimator 240 is arranged to use the combined known transmissions at the pilot cells to estimate and reduce the effects of H(n,k) within a given budget of time, complexity, power consumption and cost. The effects are estimated in both time and frequency dimension by interpolation of the samples of the CTF derived from the pilot cells. For example, distortion from frequency selective fading and noise can be estimated by calculations on the pilot cells of individual symbols along the frequency dimension. Distortions from Doppler shifts and time variation of the channel can be calculated across symbols along the time dimension. It is possible to combine both these calculations in a kind of two-dimensional channel estimation process but the computations required would be rather intensive [3]. Practical demodulators therefore carry out these calculations in sequence, often estimating the time dimension distortions first, followed by those in the frequency dimension.

In practical demodulators, ignoring the symbol number n for a given symbol, the channel is estimated by computing H(k) the channel transfer function (CTF) across all the sub-carriers in the given symbol. Then for the complex value R(k) received at at the k-th data sub-carrier position, we can estimate the transmitted complex symbol C(k) as:

$$C(k) = \frac{R(k)}{H(k)}$$

where k=0,1,2, . . . , $N_u$–1 and $N_u$ is the number of sub-carriers in the OFDM system. Specifically, in the pilot-assisted channel estimator, the above equation is used at the pilot cells to estimate the sample of the CTF at the given pilot cell.

Pilot Assisted Channel Estimation

The operation of the Pilot Assisted Channel Frequency Response Estimator 240 will now be described with reference to FIGS. 3, 4 and 5. As shown in FIG. 3, the OFDM symbol includes a number of pilot cells, the positions, expected amplitudes and phases of which are known to the receiver. The post-FFT processor 110 is able to extract these received pilot cells from the frequency domain samples output from the FFT processor 108.

Figure 4:
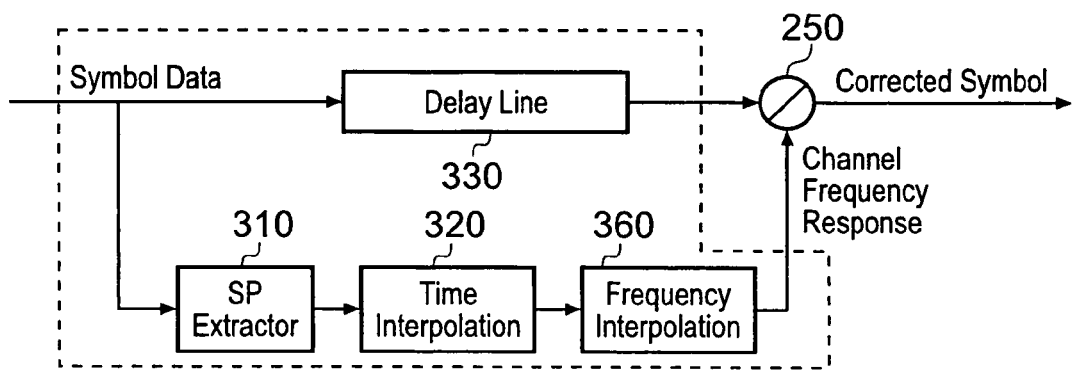
FIG. 4 schematically illustrates the pilot assisted channel estimator applicable to embodiments of the present invention.

An illustrative example of a pilot assisted channel estimator is shown in FIG. 4, which includes a scattered pilot extractor 310, a time interpolator 320, a frequency interpolator 360 and a delay line 330. As explained below the pilot extractor 310 generates samples of the channel frequency response from the extracted pilot signals. An up-sampled version of the channel frequency response is then generated by time dimension interpolation as illustrated in FIG. 5, by the time interpolator 320. A further up-sampling is performed by the frequency interpolator 360 (again illustrated in FIG. 5) so that a fully sampled version of the channel frequency response can be cancelled from the received symbol, by the channel corrector 250. The delay line 330 introduces a corresponding delay into the path of the received signal to that produced by the pilot extractor 310, the time interpolator 320 and the frequency interpolator 360. The operation of the pilot assisted channel estimator will now be explained.

For each OFDM symbol, the pilot assisted channel estimator 240 operates on the frequency domain carriers from the FFT block 108. From amongst all the carriers, the pilot carriers are identified and extracted. There are only a limited number of pilot carriers per OFDM symbol, which in the example of DVB-T are spaced nominally every twelve carriers. The channel estimator computes the value of the CTF at each pilot cell by dividing the complex value of each received pilot by its known or expected complex value. The result of this for a given OFDM symbol is in effect a twelve-fold decimated version of the CTF designated as $H_{12}(k)$. In the example of DVB-T, the pilot cells are distributed between successive OFDM symbols in a manner that allows further reduction of this sample spacing by use of time dimension processing such as described in [2]. This additional time-dimension processing has the effect of interpolating the CTF estimates over a number of successive OFDM symbols in the time dimension. In the example of DVB-T such techniques can be applied to successive estimates of $H_{12}(k)$ to produce a 3-fold decimation of the CTF estimate $H_3(k)$.

Embodiments of the present invention can provide an improvement in the time interpolation of the CTF samples to generate the up-sampled version of the CTF. The estimated CTF, which is produced following time dimension interpolation and frequency dimension interpolation, may therefore represent more accurately the CTF experienced by the OFDM symbol. As a result, the CTF can be more accurately cancelled from the received OFDM symbol, so that there is provided a greater likelihood of recovering the data accurately. One example embodiment will be described shortly.

After the time domain interpolation to provide the three fold decimated version of the CTF, the channel estimator then interpolates the CTF in the frequency domain by a factor of three so that a CTF estimate is provided for every carrier including the data-bearing carriers. The sequences $H_{12}(k)$ and $H_3(k)$ can be described in equation form as:

$$H_{12}(k) = \begin{cases} R(k)/P_c(k) & k \bmod 12 = 0 \\ 0 & \text{otherwise} \end{cases}$$

$$H_3(k) = \begin{cases} H_{12}(k) & k \bmod 12 = 0 \\ H_1(k) & k \bmod 3 = 0 \\ 0 & \text{otherwise} \end{cases}$$

where R(k) is the complex value received for the k-th sub-carrier, $P_C(k)$ is the known or expected complex value of the transmitted pilot at matrix column k and $H_I(k)$ results from time dimension processing of the $H_{12}$ along column (sub-carrier) k across neighbouring symbols [4].

The frequency dimension processing to compute the full CTF H(k) is a filtering operation to complete the 3-fold interpolation along the frequency dimension of $H_3(k)$. This filtering of $H_3(k)$ can be expressed as:

$$H(k) = \sum_{i=-M}^{M} H_3(k+i)g(M+i) \Leftrightarrow F\{h(k)G(k)\}$$

where F{.} represents the Fourier transform, $h(k) = F^{-1}\{H_3\}$ (inverse transform of $H_3(k)$) is the time domain impulse response of the channel whilst $G(k) = F\{g\}$ (the Fourier transform of the filter impulse response g(i)) is the transfer function of the frequency interpolation filter. The right-most part of this equation provides another way of interpreting the frequency interpolation filtering of $H_3(k)$ namely, frequency interpolation filtering of $H_3(k)$ can also be viewed as a windowing of the channel impulse response. Here, G(k) (transfer function of interpolation filter) is the window whilst h(k) (impulse response of the channel) is the signal to which the window is applied. Within the Post FFT processor, these CTF estimates are sent to the Channel Corrector block 250 where they are used to equalise the effect of the channel on the data.

Time Interpolation in accordance with Doppler Frequency

Embodiments of the present invention can provide an improvement to the estimation of the channel frequency response, by reducing noise associated with the time interpolation of the pilot signal derived samples. This will be explained with reference to FIGS. 6A, 6B and 6C which provide an illustration of time domain signal samples and a corresponding frequency domain representation of the time domain signal samples.

Figure 6A:
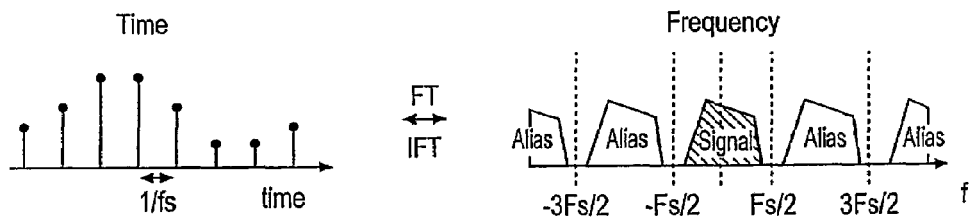
FIGS. 6A to 6C schematically illustrate the effect of 4-fold interpolation used in an embodiment of the invention.
Figure 6B:
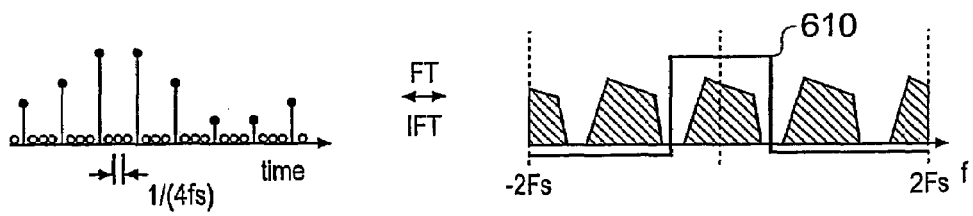
Figure 6C:
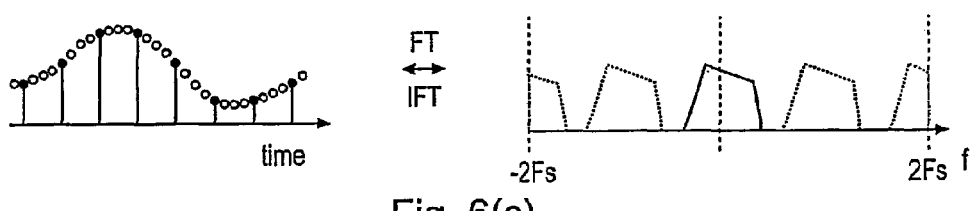

An illustration of the time domain signal samples before interpolation is shown in FIG. 6A, with a corresponding frequency domain representation. It can be seen that there are aliases present at multiples of the sampling rate (Fs) due to sampling effects. The effect of increasing the sampling rate without any filtering is shown in FIG. 6B. Three zeros have been inserted between every sample in the time domain, thus increasing the folding frequency to four times wider than before. The frequency spectrum stays the same as that of FIG. 6A, because there is no filtering applied. It is desirable to provide a time domain interpolation filter that eliminates all extra spectrums within a new folding frequency (+/−2 Fs). An example filter frequency response suitable for this purpose is illustrated in FIG. 6B by the line 610. The output data of a filtering operation using the time domain interpolation filter is shown in FIG. 6C, which has a smooth curve in the time domain and no extra spectrum within a folding frequency in the frequency domain.

To estimate a changing CTF in a time-varying channel, the cut-off frequency of the time dimension interpolation filter can be set between the current Doppler frequency (dependent on the speed at which the receiver is moving or the rate of variation of the channel) and the folding frequency (Fs/2) (determined by the sampling frequency of the pilots). In a conventional channel estimator, there is no circuit to determine the doppler frequency. Since the folding frequency is known, most time interpolation filters in conventional receivers use the folding frequency as the cut-off frequency so as not to remove any doppler spectrum. In other words, the conventional interpolation filter has the widest possible bandwidth. For example in the DVB-T system where effective symbol duration is Ts, taking into account the one in four sampling of the scattered pilots in the time dimension as illustrated in FIGS. 3 and 5, Fs=1/(4 Ts) which means that the folding frequency is 1/(8 Ts). For a continuous pilot carrier with samples every symbol, the folding frequency is 1/(2 Ts).

As long as there is no noise, there is no degradation in using the widest bandwidth interpolation filter. But, typically, this is not a usual case, and if there is noise and the doppler frequency is low, it is better to use a narrower bandwidth filter, because more noise is removed with respect to a wider bandwidth filter. As described above, the smallest cut-off frequency that the filter could have corresponds to the Doppler frequency, which represents the rate of change of the channel response. However, the conventional channel estimator has no information about the doppler frequency, and so always uses the widest bandwidth filter, even if it introduces lots of noise.

As described above, it is better to have the narrowest possible bandwidth interpolation filter so as to remove as much noise as possible, whilst passing as much channel response estimate changes as possible. To determine the bandwidth, it is necessary to estimate the Doppler frequency of the channel.

Figure 7:
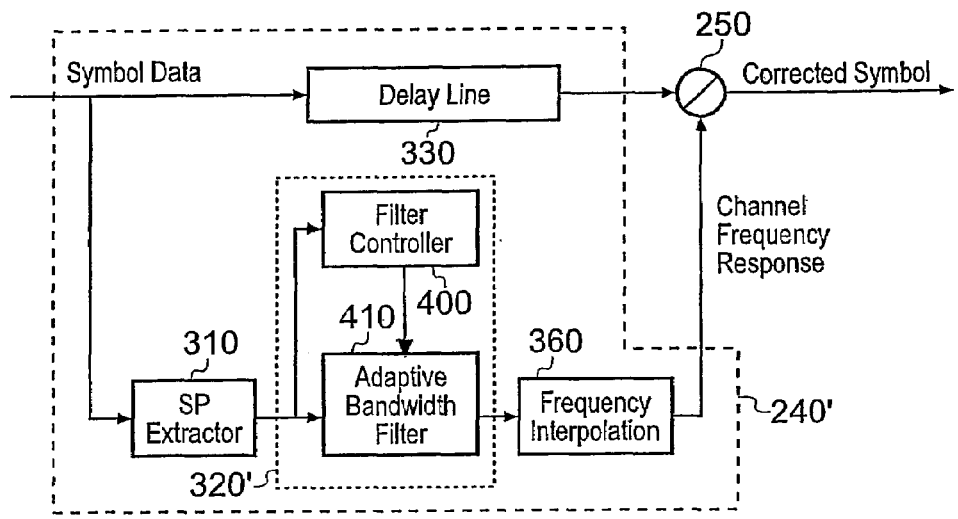
FIG. 7 schematically illustrates a channel estimator and corrector including an adapted time domain interpolator.

A pilot assisted channel estimator 240' according to an example of the present technique is provided in FIG. 7. The channel estimator 240' shown in FIG. 7 contains parts which operate in a similar way to the pilot assisted channel estimator 240 shown in FIG. 4, and so only the differences will be described. The parts of the pilot assisted channel frequency response estimator 240' of FIG. 7, which have corresponding parts to those of the channel estimator 240 of FIG. 4 have been given the same reference numerals. As shown in FIG. 7, the pilot assisted channel estimator 240', includes a time axis interpolator 320', which illustrates an embodiment of the present technique. Receivers employing the presently proposed technique include a time interpolation filter controller 400 to detect the rate of change of the channel impulse response and an adaptive bandwidth interpolation filter 410. The time interpolation filter controller 400 generates a signal, which indicates the rate of change of the channel computed from the pilot carrier signals. Typically, the rate of change is proportional to the Doppler frequency experienced by the received OFDM symbol. The rate of change signal is fed to the adaptive bandwidth interpolation filter 410, which adapts the bandwidth of the filter in accordance with the rate of change signal. An advantage is provided by the time domain interpolator 320', because the interpolation filter can be adapted to provide a pass bandwidth which is matched to the rate of change of the channel whilst as far as possible including substantially all of the energy of the channel frequency response. As a result noise in the channel frequency response estimate can be reduced. The time interpolation filter controller 400 and the adaptive bandwidth filter will be described in more detail in the following paragraphs.

Time Interpolation Filter Controller

The time interpolation filter controller operates to detect a Doppler frequency representing a rate of change of the channel transfer function (CTF). From an estimate of the channel transfer function (CTF) at each pilot position, it is possible to estimate the Doppler frequency by monitoring the CTF at the pilot positions with respect to time.

Figure 5:
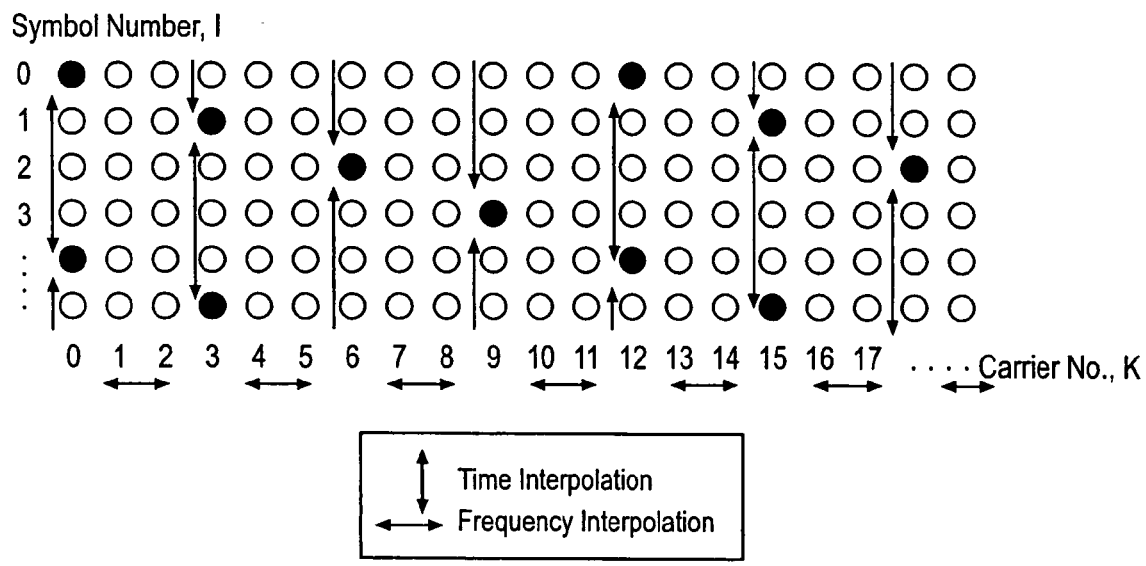
FIG. 5 is a schematic example time-frequency signal matrix showing matrix cells for which the channel frequency response estimation is derived via time axis and frequency axis processing.

In an example case of DVB-T transmission, there is a scattered pilot located once every four symbols as shown in FIGS. 3 and 5, and there is a continuous pilot located every symbol at certain carrier positions/frequencies. It is possible to monitor the channel response every four symbols at scattered pilot sub-carriers and every symbol at continuous pilot sub-carriers. These can be used to estimate the rate of change of the channel frequency response caused by the mobility i.e. the doppler frequency, as will be described below.

First Method (Absolute Method)

Figure 8:
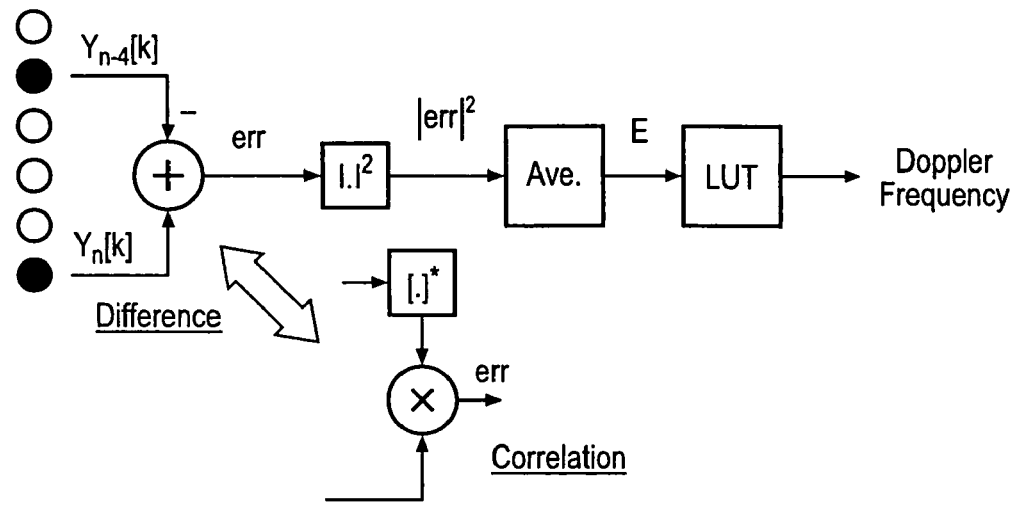
FIG. 8 schematically illustrates a first Doppler detection method applicable to embodiments of the present invention.

To estimate the Doppler frequency, a distance criterion between two pilots in the same sub-carrier position but at different symbols can be used. Such an arrangement of the filter controller 400 is illustrated in FIG. 8 and can be expressed in equation form by:

$$E = \begin{cases} \sum_k D[Y_n(k), Y_{n-4}(k)] & SP/CP \\ \sum_k D[Y_n(k), Y_{n-1}(k)] & CP \end{cases}$$

where D[a,b] is a distance measure between the complex values a and b, $Y_n(k)$ is a pilot of symbol n at sub-carrier position k. The first equation (SP/CP) provides a distance criterion between the CTF of symbols that are separated by 4 times the symbol duration and so either continuous or scattered pilots can be used for this. The second equation (CP) provides a distance criterion between the CTF of symbols that are separated by one symbol interval and so only continuous pilots are suitable for this. The criterion D[.] can be defined in two ways: as a measure of absolute difference or a measure of correlation. These two cases are illustrated in FIG. 8 and can be described by the following equations, respectively:

$$D[a, b] = (a-b)^2$$

$$D[a,b] = |ab^*|$$

where b* is the complex conjugate of b. By using the first equation (difference criterion) a value of D[.] that is directly proportional to the doppler frequency is generated. If the complex conjugate multiplication equation (correlation criterion) is used, a value of D[.] inversely proportional to the doppler frequency is generated. In either case therefore, the value of $D[Y_n(k), Y_m(k)]$ is a measure of the change in the CTF along the k-th pilot from symbol n to symbol m. As such, by taking the average of the distances D[.] for all the pilots in a given symbol, it is possible to estimate the Doppler frequency.

The first method for estimating the doppler frequency is illustrated in FIG. 8. The signal E representing the mean distance computed across all the scattered pilots is used as input to a look-up table. The look-up table implements a translation of the input distance criterion into a doppler frequency value which it outputs. This table is designed using a distance criterion versus doppler frequency characteristic such as those shown in FIG. 10.

Second Method (Relative Method)

The first method, described above, works under ideal channel conditions, but it is sensitive to noise and other synchronization errors, because it depends upon only one result. In the presence of channel degradations the estimated doppler frequency can diverge significantly from its true value especially as the mapping from distance criterion to doppler frequency uses fixed thresholds. To reduce these errors, it is desirable to have some relative value to compare with the first method result.

Figure 9:
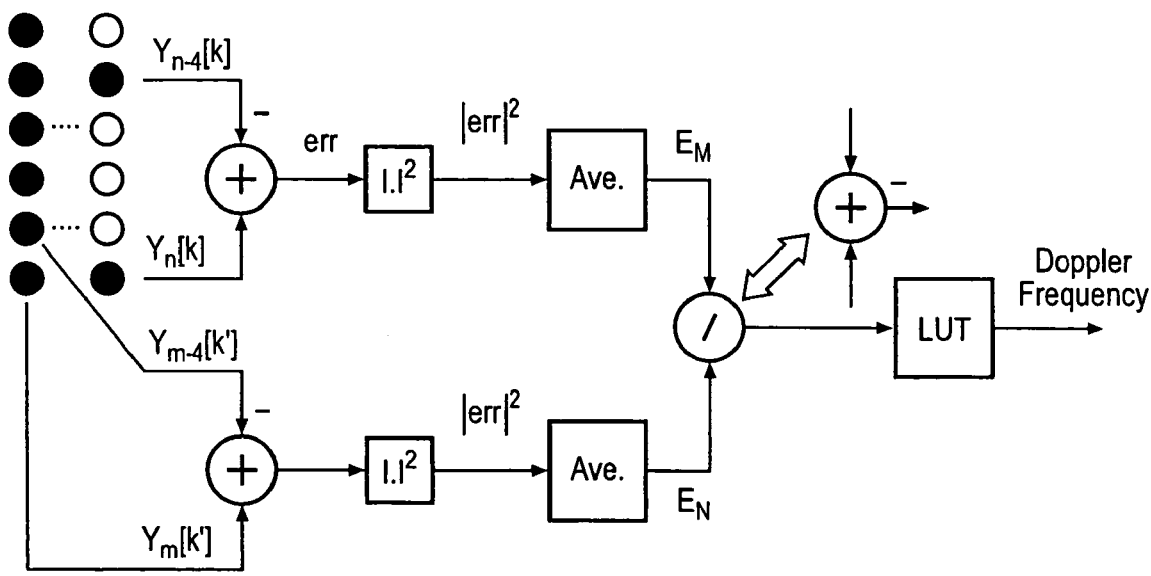
FIG. 9 schematically illustrates a second Doppler detection method applicable to embodiments of the present invention.
Figure 10:
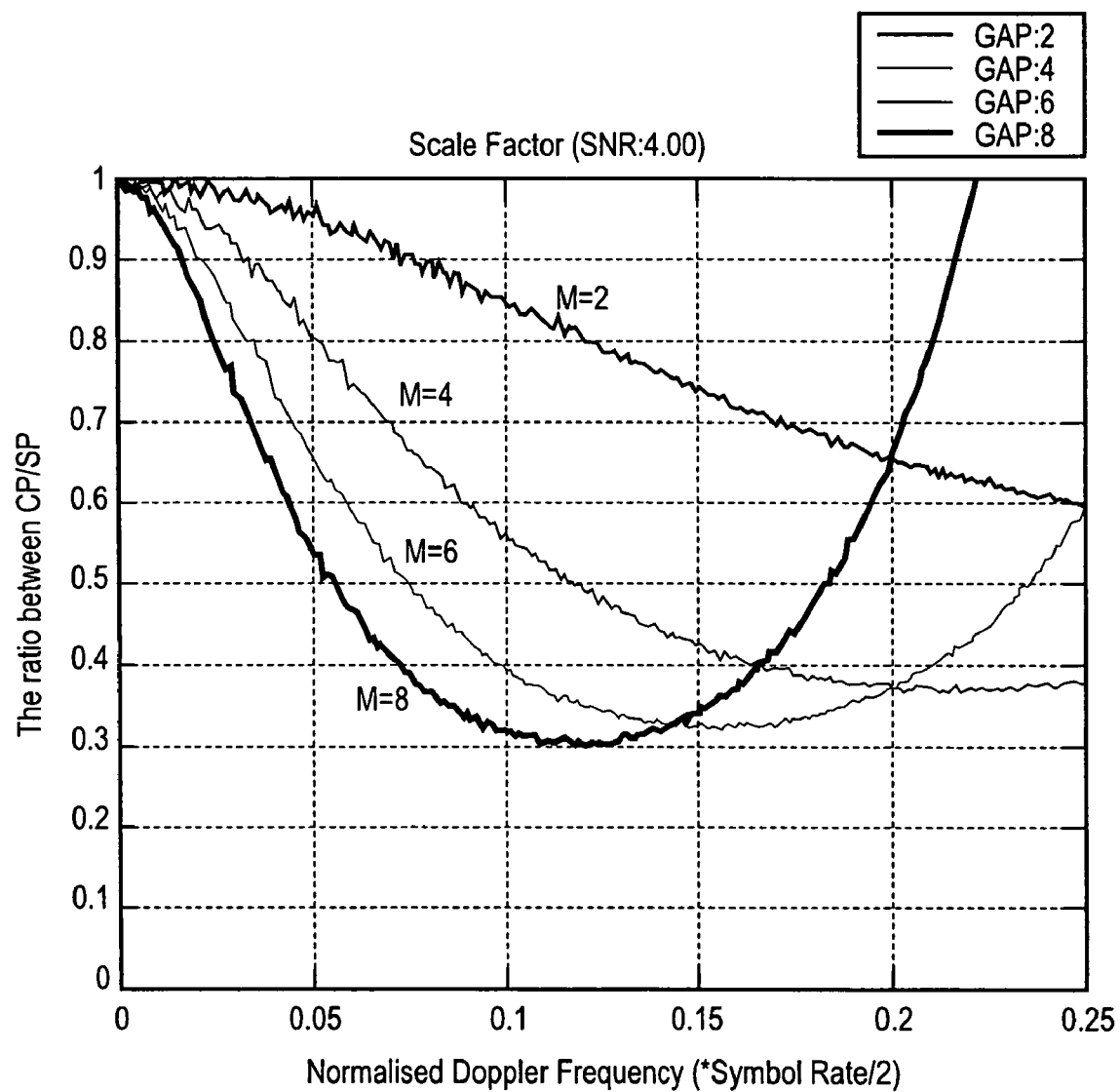
FIG. 10 schematically illustrates example simulated results of the Doppler frequency estimator for N=1 (fixed) and M=2 to 8, providing a graphical plot of the normalized Doppler frequency with respect to the output of the estimator.

The second method uses two sets of distance criteria between two differently spaced pilots. In this method two CTF distance criteria are computed and then compared to create a more reliable input into the distance to doppler frequency translation look-up table. The two CTF distance criteria $E_M$ and $E_N$ are computed respectively, between CTFs separated by M and N symbol intervals. The filter controller 400 operating in accordance with the second technique is illustrated in FIG. 9. The filter controller therefore operates to generate the estimate of the rate of change of the channel frequency response from a comparison of samples of the channel frequency response derived from the pilot signals at different relative locations within temporally separated OFDM symbols. According to the embodiment represented by the diagram in FIG. 9, the estimate of the rate of change of the channel frequency response is based on either the ratio or the difference between $E_N$ and $E_M$. Accordingly, the input into the look-up table can either be a ratio of or difference between $E_N$ and $E_M$ as illustrated in FIG. 9. The difference between these is in the transfer characteristic of the distance criterion to doppler frequency translator look-up table. Example characteristics based on the ratio of $E_N$ to $E_M$ are shown in FIG. 10. Similar transfer characteristics can be derived based on the difference between $E_N$ and $E_M$. The distance criterion to doppler frequency mapping look-up table is then derived from such characteristics.

A preferred case for DVB-T is to use (M, N)=(4, 1), because scattered pilots can be used for $E_M$ whilst continuous pilots are used for $E_N$.

However, any combination of these two parameters (M, N) may be used, each combination having a different sensitivity for a particular Doppler frequency range. For example whilst (M,N)=(6,1) is more discriminating at lower Doppler frequencies (high gradient) than at higher doppler frequencies, (M,N)=(4,1) is less discriminating at lower frequencies (lower gradient) but can be used for a wider range of Doppler frequencies as it is relatively monotonic up to the folding frequency.

Adaptive Bandwidth Filter

The adaptive bandwidth filter 410 is in principle relatively simple compared to the time domain filter controller 400. The adaptive bandwidth filter 410 receives the rate of change signal from the filter controller 400, which is derived by use of either or both of the two methods illustrated in FIGS. 8 and 9, and changes the filter bandwidth in dependence upon the frequency indicated by the signal. In the ideal case the bandwidth is adapted to have the narrowest possible bandwidth without removing any doppler components.

The most simple method to implement this function is to prepare several filters that have different bandwidths, and select one of them depending upon the Doppler frequency information provided by the filter controller 400. An advantage of this technique is that because the Doppler frequency is estimated, the time interpolation filter bandwidth can be optimised on the basis of the estimated Doppler frequency of the received signal. As a result of this optimisation, the channel estimator can be configured to operate well both in static and mobile channels. A conventional channel estimator could not achieve this flexibility, principally because a conventional receiver has no information concerning the Doppler frequency, and so it has to be optimised during design specifically for either mobile or static channels (it cannot cope with both without undesirable signal degradation).

FIG. 10 schematically illustrates example distance criterion to doppler frequency characteristics that can be used for designing the translation table for the Doppler frequency estimator output. These examples use N=1 (fixed) and sweep M from 2 to 8. The horizontal axis represents the normalized Doppler frequency i.e. normalized to half the OFDM symbol rate, whilst the vertical axis represents the output of the distance criterion estimator based on the ratio of $E_N$ to $E_M$. Each M value line has a different slope. The reason why the M=6,8 results returns to a high value at higher Doppler frequencies is due to a phase ambiguity which results by comparing a pilot signal which has changed to a value which is close to a value of the pilot with which it is compared. As such when the Doppler frequency is high, the difference between two pilots becomes small again, as a result of the phase ambiguity, thereby producing a false indication of a low Doppler frequency. Taking the characteristic for M=2 from FIG. 10, an example distance criterion to doppler frequency look-up table is:

| Distance Criterion Value | Normalised Doppler Frequency |
|---|---|
| 1.00 | 0.00 |
| 0.95 | 0.05 |
| 0.85 | 0.10 |
| 0.75 | 0.15 |
| 0.65 | 0.20 |
| 0.60 | 0.25 |

Similar look-up tables can be designed for other distance criteria and their corresponding characteristics.

Summary of Operation

Figure 11:
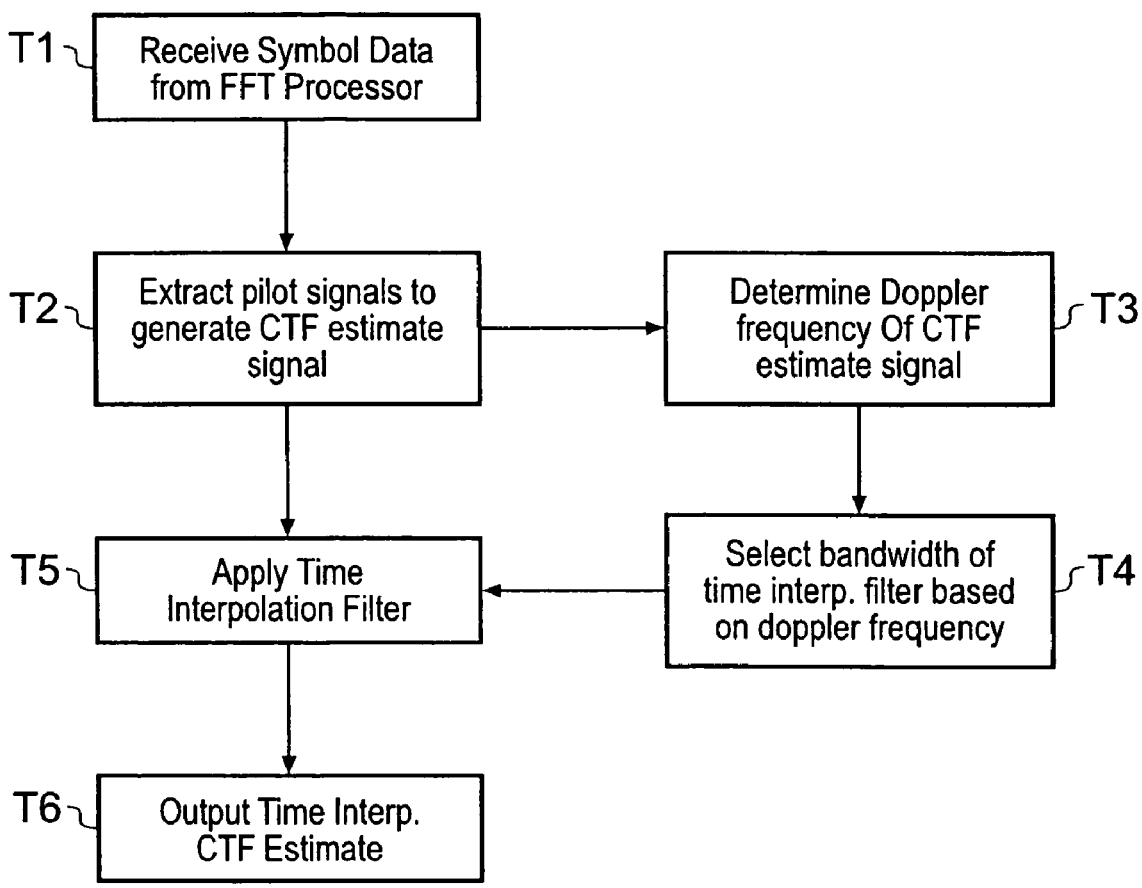
FIG. 11 provides a schematic flow diagram illustrating the operation of an adaptive bandwidth time interpolation filter.

The operation of the technique described above is summarised by flow diagram in FIG. 11. FIG. 11 schematically illustrates the method for performing time interpolation of the channel transfer function (CTF) estimate derived from the pilot signals received with the OFDM signal. Referring to FIG. 11, at a step T1, symbol data including pilot signals is received from an FFT processor. At a step T2, pilot signals are extracted from the symbol data and used to generate the 12-fold decimated version of the CTF estimate. Many of these are stored for successive symbols. At a step T3, a rate of change of the CTF estimate caused by the Doppler frequency experienced by the received signal is determined by comparing the extracted pilot signals at given pilot positions at different times. The Doppler frequency is an indication of how rapidly the CTF is changing as a function of time. At a step T4, a suitable bandwidth for a time interpolation filter to be applied to the CTF estimate is selected on the basis of the determined Doppler frequency. At a step T5, a time interpolation filter having a bandwidth as selected at the step T4 is applied to the CTF estimate signal generated at the step T2. This results in a time interpolated CTF estimate, which is output at a step T6.

Various modifications may be made to the example embodiments herein before described without departing from the scope of the present invention. For instance, it will be appreciated that the term pilot should be interpreted broadly as meaning any signal or data symbols, which are transmitted with the data to be communicated, and which are known to the receiver.

REFERENCES

[1] Co-pending UK patent application serial number 0115061.4.
[2] M. Alard, R. Lassalle, "Principles of modulation and channel coding for digital broadcasting for mobile receivers", EBU Review, No. 224, August 1987.
[3] M. Speth, S. Fechtel, et al, "Optimum receiver design for OFDM-based broadband transmission—Part II: A case study", IEEE trans. On Communications, pg 571 to 578, vol. 49, No. 4, April 2001.
[4] Erik Stare, "*Mobile reception of 2K and 8K DVB-T Signals*," Proceedings of IBC '98 pp 473-478.
[5] S. Atungsiri, J. Wilson, "Maximum-Likelihood symbol acquisition for DVB-T receivers", Great Britain Patent Application No. 0027424.1, 9 November 2000.
[6] S. Atungsiri, J. Wilson, "Closed-loop pilot assisted symbol tracker for DVB-T receivers", European Patent Application No. 02254020.7, 10 June 2002.
[7] S. Atungsiri, "OFDM demodulation for channels with long delay spreads", United Kingdom Patent Application No. 0225039.7, 28 October 2002.
[8] EN 300 744 Digital Video Broadcasting (DVB) Framing structure, channel coding and modulation for digital terrestrial television.

The invention claimed is:

1. A receiver for recovering data from a received symbol of signal samples generated in accordance with Orthogonal Frequency Division Multiplexing (OFDM), the symbol including pilot signals provided at different sub-carrier locations for each of a set of OFDM symbols, the sub-carrier locations of the pilot signals being repeated for subsequent sets of symbols, said receiver comprising:

a pilot assisted channel estimator operable to generate an estimate of a transfer function of a transmission channel through which the received OFDM symbol has passed, the pilot assisted channel estimator including
 a pilot extractor operable to extract the pilot carrier signals from the signal samples, and to generate an estimate of a sample of a channel frequency response for each pilot signal in the received OFDM symbol, by comparing the extracted pilot carrier signals with predetermined versions of the pilot carriers,
 a time interpolation filter controller; and
 an adaptive bandwidth time interpolation filter operable to interpolate the samples of the channel frequency response estimate derived from the pilot carrier signals at corresponding said sub-carrier locations within temporally separated OFDM symbols to generate an interpolated version of the channel frequency response estimate,
 wherein the time interpolation filter controller is operable to generate an estimate of a rate of change of the channel frequency response with time and to adapt a pass bandwidth of the time interpolation filter in accordance with the estimated rate of change of the channel.

2. The receiver as claimed in claim 1, wherein the time interpolation filter controller is operable to reduce the pass bandwidth of the time interpolation filter to reduce noise with respect to an amount of energy in the channel frequency response.

3. The receiver as claimed in claim 1, wherein the adaptive bandwidth time interpolation filter comprises a plurality of interpolation filters each having a predetermined pass bandwidth, and the time interpolation filter controller is operable to select one of the plurality of predetermined filters in accordance with the estimated rate of change of the channel.

4. The receiver as claimed in claim 1, wherein the time interpolation filter controller is operable to generate the estimate of the rate of change of the channel frequency response from a comparison of at least two samples of the channel frequency response determined from corresponding sub-carrier locations within temporally separated OFDM symbols.

5. The receiver as claimed in claim 4, wherein the rate of change of the channel frequency response is generated from a look-up table, the table providing rate of change values with respect to values from the comparison of samples of the channel frequency response, the comparison being used as an index to the look-up table to provide the estimate of the rate of change.

6. The receiver as claimed in claim 4, wherein the time interpolation filter controller is operable to generate the estimate of the rate of change of the channel frequency response from a ratio of a first comparison of samples of the channel frequency response from corresponding said sub-carrier locations from OFDM symbols separated by an integer value n OFDM symbols and a second comparison of samples of the channel frequency response from corresponding sub-carrier locations from OFDM symbols separated by an integer value m in OFDM symbols.

7. The receiver as claimed in claim 6, wherein the rate of change of the channel frequency response is generated from a look-up table, the table providing rate of change values with respect to values from the ratio of first and second comparisons, the ratios being used as an index to the look-up table to provide the estimate of the rate of change.

8. The receiver as claimed in claim 4, wherein the comparison of the samples of the channel frequency response from corresponding sub-carrier locations comprises forming a difference between the samples.

9. The receiver as claimed in claim 4, wherein the comparison of the samples of the channel frequency response from corresponding said sub-carrier locations comprises forming a correlation between the samples.

10. The receiver as claimed in claim 1, wherein the generated estimate of the rate of change of the channel corresponds to a Doppler frequency of the OFDM symbol as experienced by the receiver.

11. The receiver according to claim 1, further comprising;
a channel correction processor operable to reduce the effects of the propagation channel in the received symbol by substantially cancelling the channel frequency response estimate from the received symbol.

12. A pilot assisted channel estimator operable to generate an estimate of a transmission channel through which a received Orthogonal Frequency Division Multiplexed (OFDM) symbol has passed, the OFDM symbol including pilot signals provided at different sub-carrier locations for each of a set of OFDM symbols, the sub-carrier locations of the pilot signals being repeated for subsequent sets of symbols, the pilot assisted channel estimator comprising a pilot extractor operable to extract the pilot carrier signals from samples of the received OFDM symbol, and to generate an estimate of a sample of a channel frequency response for each pilot signal in the received OFDM symbol, by comparing the extracted pilot carrier signals with predetermined versions of the pilot carriers;

a time interpolation filter controller; and an adaptive bandwidth time interpolation filter operable to interpolate the samples of the channel frequency response estimate derived from the pilot carrier signals at corresponding said sub-carrier locations within temporally separated OFDM symbols to generate an interpolated version of the channel frequency response estimate;

wherein the time interpolation filter controller is operable to generate an estimate of a rate of change of the channel frequency response with time and to adapt a pass bandwidth of the time interpolation filter in accordance with the estimated rate of change of the channel.

13. The pilot assisted channel estimator as claimed in claim 12, wherein the time interpolation filter controller is operable to reduce the pass bandwidth of the time interpolation filter to reduce noise with respect to an amount of energy in the channel frequency response.

14. The pilot assisted channel estimator as claimed in claim 12, wherein the adaptive bandwidth time interpolation filter comprises a plurality of interpolation filters each having a predetermined pass bandwidth, and the time interpolation filter controller is operable to select one of the plurality of predetermined filters in accordance with the estimated rate of change of the channel.

15. The pilot assisted channel estimator as claimed in claim 12, wherein the time interpolation filter controller is operable to generate the estimate of the rate of change of the channel frequency response from a comparison of at least two samples of the channel frequency response taken from corresponding said sub-carrier locations within temporally separated OFDM symbols.

16. A method of generating an estimate of a transmission channel through which a received Orthogonal Frequency Division Multiplexed (OFDM) symbol has passed, the OFDM symbol including pilot signals provided at different sub-carrier locations for each of a set of OFDM symbols, the sub-carrier locations of the pilot signals being repeated for subsequent sets of symbols, the method comprising:

extracting the pilot carrier signals from samples of the received OFDM symbol, generating an estimate of a sample of a channel frequency response for each said pilot signal in the received OFDM symbol, by comparing the extracted pilot carrier signals with predetermined versions of the pilot carriers;

interpolating the samples of a channel frequency response derived from the pilot carrier signals at corresponding sub-carrier locations within temporally separated OFDM symbols to generate an interpolated version of the channel frequency response estimate using a time interpolation filter, generating an estimate of a rate of change of the channel frequency response with time, and adapting a pass bandwidth of the time interpolation filter in accordance with the estimated rate of change of the channel.

17. A method of generating an estimate of a transmission channel as claimed in claim 16, wherein the adapting of the pass bandwidth includes reducing the pass bandwidth of the time interpolation filter to reduce noise with respect to an amount of energy in the channel frequency response.

18. A method of generating an estimate of a transmission channel as claimed in claim 16, wherein the generating the estimate of the rate of change includes comparing at least two samples of the channel frequency response taken from corresponding said sub-carrier locations within temporally separated OFDM symbols.

19. A method of generating an estimate of a transmission channel as claimed in claim 18, wherein the generating the estimate of the rate of change by comparing at least two samples includes generating a ratio of a first comparison of samples of the channel frequency response from corresponding said sub-carrier locations from OFDM symbols separated by an integer value n OFDM symbols and a second comparison of samples of the channel frequency response from corresponding sub-carrier locations from OFDM symbols separated by an integer value m in OFDM symbols, and determining the rate of change of the channel frequency response from the comparison.

20. An apparatus for generating an estimate of a transmission channel through which a received Orthogonal Frequency Division Multiplexed (OFDM) symbol has passed, the OFDM symbol including pilot signals provided at different sub-carrier locations for each of a set of OFDM symbols, the sub-carrier locations of the pilot signals being repeated for subsequent sets of symbols, the apparatus comprising:

means for extracting the pilot carrier signals from samples of the received OFDM symbol, means for generating an estimate of a sample of a channel frequency response for each of the pilot signal in the received OFDM symbol, by comparing the extracted pilot carrier signals with predetermined versions of the pilot carriers;

means for interpolating the samples of a channel frequency response derived from pilot carrier signals at corresponding said sub-carrier locations within temporally separated said OFDM symbols to generate an interpolated version of the channel frequency response estimate, means for generating an estimate of a rate of change of the channel frequency response with time, and means for adapting a pass bandwidth of the means for interpolating in accordance with the estimated rate of change of the channel.

* * * * *